United States Patent
Inoue

(10) Patent No.: US 10,406,688 B2
(45) Date of Patent: Sep. 10, 2019

(54) OFFLINE PROGRAMMING APPARATUS AND METHOD HAVING WORKPIECE POSITION DETECTION PROGRAM GENERATION FUNCTION USING CONTACT SENSOR

(71) Applicant: FANUC CORPORATION, Yamanashi (JP)

(72) Inventor: Kouzou Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/946,867

(22) Filed: Apr. 6, 2018

(65) Prior Publication Data
US 2018/0290304 A1 Oct. 11, 2018

(30) Foreign Application Priority Data
Apr. 10, 2017 (JP) ................. 2017-077721

(51) Int. Cl.
*B25J 9/16* (2006.01)
*G05B 19/42* (2006.01)
*B25J 13/08* (2006.01)

(52) U.S. Cl.
CPC .......... *B25J 9/1666* (2013.01); *B25J 9/1671* (2013.01); *B25J 13/084* (2013.01); *G05B 19/4202* (2013.01)

(58) Field of Classification Search
None
See application file for complete search history.

(56) References Cited

U.S. PATENT DOCUMENTS

| | | | | |
|---|---|---|---|---|
| 5,798,627 A | * | 8/1998 | Gilliland | B25J 9/1671 318/568.13 |
| 5,905,430 A | * | 5/1999 | Yoshino | B25J 13/084 340/407.1 |
| 2012/0031886 A1 | * | 2/2012 | Hara | B23K 9/095 219/137 R |

(Continued)

FOREIGN PATENT DOCUMENTS

| | | |
|---|---|---|
| JP | H6-285636 A | 10/1994 |
| JP | H9-183087 A | 7/1997 |

(Continued)

*Primary Examiner* — Ryan Rink
(74) *Attorney, Agent, or Firm* — Hauptman Ham, LLP

(57) ABSTRACT

An offline programming apparatus includes a first part which causes an operator to designate contact points at which a contact sensor arranged at a distal end of a robot contacts a workpiece on a 3D model of the workpiece, a second part which automatically adds detection starting points in operations of the robot which approaches each of the contact points in directions of movement along coordinate axes of a reference coordinate system with reference to which the operation of the robot to detect the position of the workpiece is performed, at positions where no interference occurs between the robot and the workpiece in a virtual space, and a third part which automatically adds an interference avoidance point in the virtual space in order to avoid the interference if the robot and workpiece interfere with each other on a movement path of the robot which moves between the detection starting points.

5 Claims, 7 Drawing Sheets

(56) References Cited

U.S. PATENT DOCUMENTS

| | | | |
|---|---|---|---|
| 2013/0116822 A1* | 5/2013 | Atohira | G05B 19/4097 700/255 |
| 2014/0088746 A1* | 3/2014 | Maloney | B25J 9/1684 700/97 |
| 2016/0096269 A1* | 4/2016 | Atohira | B25J 9/1687 700/264 |
| 2016/0151913 A1* | 6/2016 | Nagatsuka | B25J 11/005 700/251 |
| 2016/0370172 A1* | 12/2016 | Christoph | G01B 5/012 |
| 2017/0113324 A1* | 4/2017 | Romanoff | B24C 1/045 |
| 2018/0065249 A1* | 3/2018 | Inoue | B25J 9/1605 |
| 2018/0260496 A1* | 9/2018 | Inoue | B23Q 3/00 |
| 2019/0054617 A1* | 2/2019 | Huang | B25J 9/163 |
| 2019/0077016 A1* | 3/2019 | Atohira | B25J 9/1605 |
| 2019/0080446 A1* | 3/2019 | Kuzmin | G06T 7/001 |

FOREIGN PATENT DOCUMENTS

| | | |
|---|---|---|
| JP | 2004-17198 A | 1/2004 |
| JP | 2011-170522 A | 9/2011 |
| JP | 2011-230243 A | 11/2011 |

* cited by examiner

in its entirety.

OFFLINE PROGRAMMING APPARATUS AND METHOD HAVING WORKPIECE POSITION DETECTION PROGRAM GENERATION FUNCTION USING CONTACT SENSOR

RELATED APPLICATIONS

The present application claims priority to Japanese Patent Application No. 2017-077721 filed on Apr. 10, 2017, the disclosure of which is hereby incorporated by reference herein in its entirety.

BACKGROUND OF THE INVENTION

1. Field of the Invention

The present invention relates to a robot control technology, and in particular, it relates to an offline programming apparatus and method having a workpiece position detection program generation function using a contact sensor.

2. Description of Related Art

A method for correcting a teaching position in a welding program is known, which comprising the steps of bringing a contact sensor arranged at a distal end of a robot in contact with a workpiece to be welded, detecting the position of the workpiece based on a position of the robot at the time of contact, and performing welding in accordance with the detected position of the workpiece. A method for generating sensing operation data for detecting the position of the workpiece is disclosed in, for example, Japanese Unexamined Patent Publication (Kokai) No. 2011-170522. In this patent document, in a sensing attitude where a contact-type sensor of a work manipulator is in contact with the workpiece, a contact surface of the workpiece with which the contact-type sensor is in contact is extracted, one edge which defines the contact surface is selected, the sensing attitude of the work manipulator is reset so that the position of the selected one edge is coincident with a position in which the set position set on the base end side of the contact-type sensor is projected onto the contact surface, and the sensing operation data of the work manipulator is generated so as to include the reset sensing attitude.

SUMMARY OF THE INVENTION

In the detection operation to detect the position of the workpiece based on the contact sensor arranged at the distal end of the robot, it is necessary to designate a plurality of contact points at which the contact sensor is in contact with the workpiece. However, it is difficult to perform the detection operation on a movement path of the robot which moves among a plurality of detection starting points in a plurality of robot operations to detect each of the plurality of contact points so as not to cause interference between the robot and the workpiece. Furthermore, when the detection operation is performed in a real robot, if the robot actually interferes with the workpiece, there is a risk that the user may suffer a heavy loss.

Under these circumstances, a technology to generate a workpiece position detection program which prevents the robot from interfering with the workpiece even on the movement path of the robot along which the robot moves between a plurality of detection starting points has been demanded.

According to an embodiment of the disclosed invention of the present application, there is provided an offline programming apparatus which automatically generates a machining program based on a machining line or point designated on a three-dimensional model of a workpiece to be machined by a robot and automatically generates a workpiece position detection program to detect a position of the workpiece in order to correct the machining program in accordance with the position of the workpiece detected based on a contact sensor arranged at a distal end of the robot, the apparatus comprising a storage unit which stores therein the three-dimensional model of the workpiece, a contact point designation part which causes an operator to designate a plurality of contact points at which the contact sensor contacts the workpiece on the three-dimensional model of the workpiece, a detection starting point addition part which automatically adds a plurality of detection starting points in the operations of the robot which approaches each of the plurality of contact points in directions of movement along coordinate axes of a reference coordinate system with reference to which the operation of the robot to detect the position of the workpiece is performed, at positions where no interference occurs between the robot and the workpiece in a virtual space, an interference avoidance point addition part which detects the presence or absence of interference between the robot and the workpiece on the movement path of the robot which moves between the plurality of detection starting points, and if there is interference, automatically adds an interference avoidance point in the virtual space in order to avoid the interference, and a workpiece position detection program generation part which automatically generates the workpiece position detection program to repeat the operations of the robot which moves between the detection starting points and the contact points in a direction of movement along the coordinate axis of the reference coordinate system, and if there is an interference avoidance point, moves from one detection starting point through the interference avoidance point to another detection starting point.

According to another embodiment of the disclosed invention of the present application, there is provided an offline programming method for automatically generating a machining program based on a machining line or point designated on a three-dimensional model of a workpiece to be machined by a robot and automatically generating a workpiece position detection program to detect a position of the workpiece in order to correct the machining program in accordance with the position of the workpiece detected based on a contact sensor arranged at a distal end of the robot, the method comprising the steps of storing the three-dimensional model of the workpiece in a storage unit, causing an operator to designate a plurality of contact points at which the contact sensor contacts the workpiece on the three-dimensional model of the workpiece, automatically adding a plurality of detection starting points in the operations of the robot which approaches each of the plurality of contact points in directions of movement along coordinate axes of a reference coordinate system with reference to which the operation of the robot to detect the position of the workpiece is performed, at positions where no interference occurs between the robot and the workpiece in a virtual space, detecting the presence or absence of interference between the robot and the workpiece on the movement path of the robot which moves between the plurality of detection starting points, and if there is interference, automatically adding an interference avoidance point in the virtual space in order to avoid the interference, and automatically generating the workpiece position detection program to repeat the operations of the robot which moves between the detection starting points and the contact points in a direction of movement along the coordinate axis of the reference coordinate system, and if there is an interference avoidance point, moves from one detection starting point through the interference avoidance point to another detection starting point.

DETAILED DESCRIPTION

Figure 1:
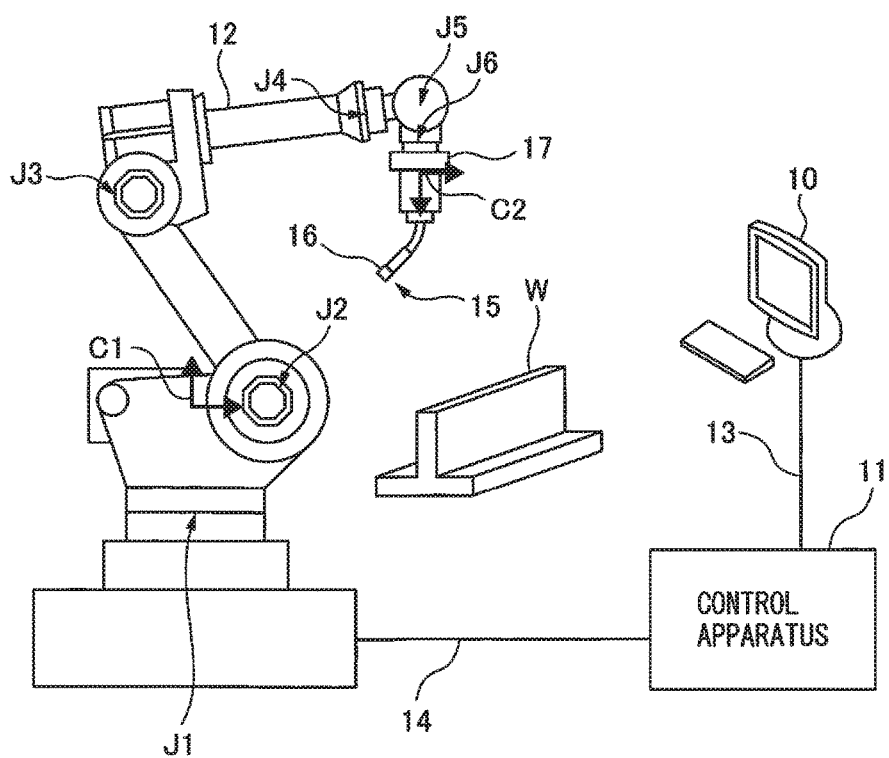
FIG. 1 is a schematic view of an offline programming apparatus according to an embodiment of the present invention, a robot control apparatus, and a robot.

The embodiments of the disclosed invention of the present application will be described in detail below with reference to the accompanying drawings. In the drawings, the same or corresponding components are assigned same or similar reference numerals or symbols. The embodiments which will be discussed below are not intended to limit the technical scope of the invention and the significance of the terms described in the claims.

FIG. 1 schematically shows an offline programming apparatus 10 according to an embodiment of the present invention, a robot control apparatus 11 that controls a robot, and a robot 12. The offline programming apparatus 10 is capable of communicating with the control apparatus 11 via a cable 13. The control apparatus 11 is capable of communicating with the robot 12 via a cable 14. In another embodiment, the offline programming apparatus 10 may be capable of wirelessly communicating with the control apparatus 11. The offline programming apparatus 10 generates a machining program based on which the robot 12 performs machining operations, such as welding, drilling, cutting, color coating, or the like, of a workpiece W, and a workpiece position detection program for detecting the position of the workpiece W to correct the machining program in accordance with the position of the workpiece W detected on the basis of a contact sensor 16 disposed at a distal end 15 of the robot 12, offline. The workpiece position detection program and the machining program generated by the offline programming apparatus 10 are transmitted to the control apparatus 11 which instructs the robot 12 to perform a detection operation to detect the position of the workpiece W in accordance with the workpiece position detection program. In the detection operation, when the contact sensor 16 arranged at the robot distal end 15 contacts the workpiece W, the position of the workpiece W is detected from the position of the robot at that time. The position information of the machining program is corrected in accordance with the detected position of the workpiece W, and the control apparatus 11 commands the robot 12 to perform a machining operation to machine the workpiece W in accordance with the corrected machining program.

The robot 12 is composed of a well-known robot manipulator and is provided with six joint axes J1 to J6 having servo motors (not shown), etc. The robot 12 defines world coordinates C1 which are set in a space and a mechanical interface coordinates C2 which are set at a position of a flange 17. The control apparatus 11 is configured to convert the position of the workpiece W detected based on the contact sensor 16 between the world coordinates C1 and the mechanical interface coordinates C2 using a well-known method.

Figure 2:
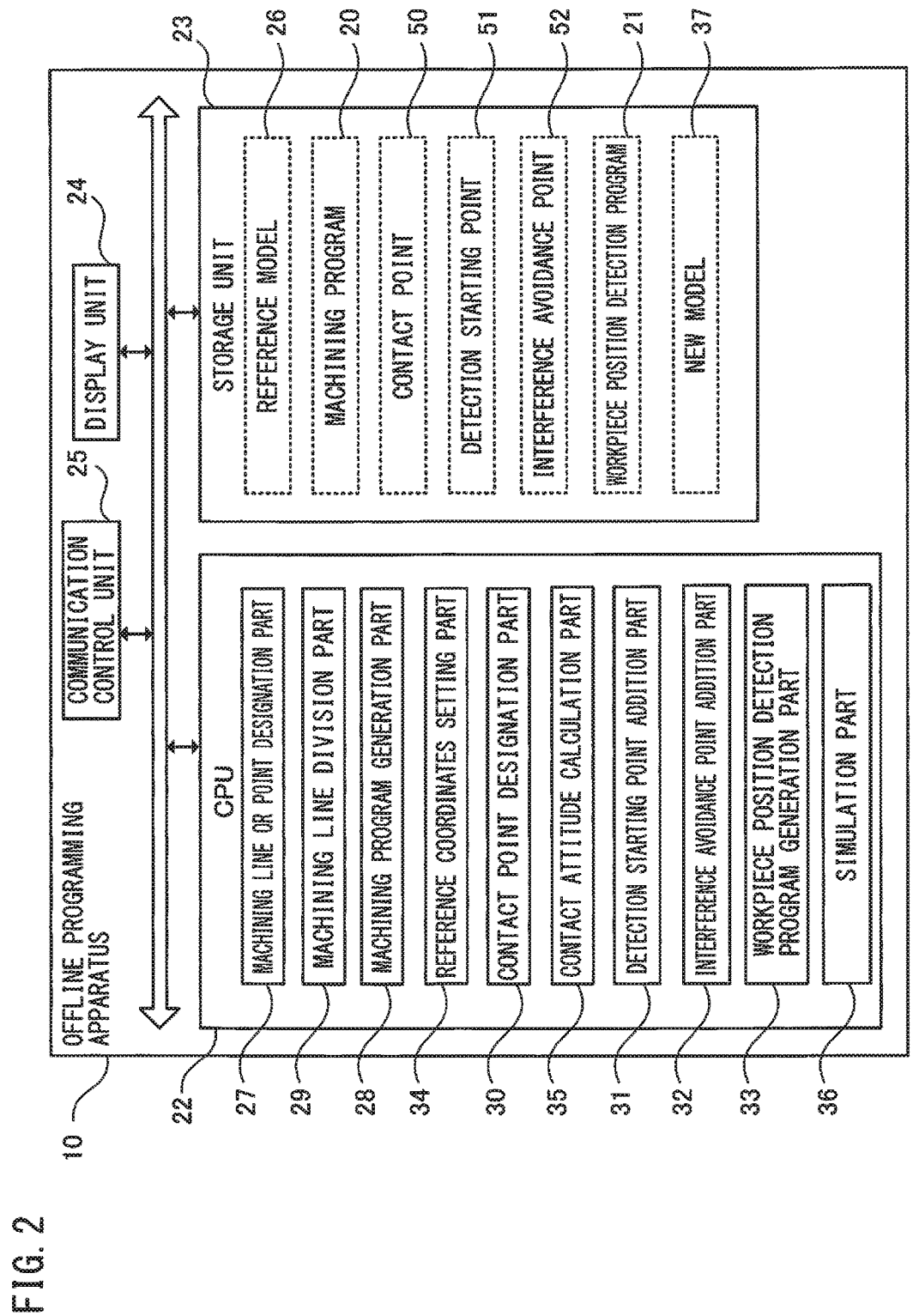
FIG. 2 is a block diagram of an offline programming apparatus according to an embodiment of the present invention.

FIG. 2 illustrates a block diagram of the offline programming apparatus 10 according to the embodiment of the invention. The offline programming apparatus 10 is configured to generate a machining program 20 and a workpiece position detection program 21 offline and simulate the machining program 20 and the workpiece position detection program 21 offline. The offline programming apparatus 10 is composed of a well-known computer and is provided with a CPU 22 which performs various arithmetic operations, a storage unit 23 which stores various data, a display unit 24 which displays various data, and a communication control unit 25 which is capable of communicating with external devices. The offline programming apparatus 10 is provided with software (not shown) in accordance with which the configuration of the CPU 22 shown in FIG. 2 executes the respective operations. The CPU 22 may be provided with hardware components which perform the respective operations.

In order to generate the machining program, the CPU 22 is provided with a machining line or machining point designation part 27 and a machining program generation part 28. The machining line or point designation part 27 is configured such that the display unit 24 displays a reference model 26 of the workpiece stored in the storage unit 23 and the operator designates one or a plurality of machining lines or points on the displayed reference model 26 of the workpiece using a mouse or the like. A three-dimensional model of the workpiece prepared based on CAD data, etc., may be used as the reference model 26 of the workpiece. The machining program generation part 28 generates the machining program 20 based on the designated machining line or points. The machining program 20 generated by the machining program generation part 28 is stored in the storage unit 23. Optionally, the CPU 22 may comprise a machining line division part 29 which divides the designated machining line into a plurality of machining lines.

In order to generate the workpiece position detection program 21, the CPU 22 comprises a contact point designation part 30, a detection starting point addition part 31, an interference avoidance point addition part 32 and a workpiece position detection program generation part 33. The contact point designation part 30 causes the operator, etc., to designate a plurality of contact points at which the contact sensor contacts the workpiece on the workpiece reference model 26 using a mouse, etc. A plurality of contact points 50 designated using the contact point designation part 30 are stored in the storage unit 23. The detection starting point addition part 31 automatically adds a plurality of detection starting points in the course of a plurality of operations of the robot which approaches each of the plurality of contact points in the direction of movement along the coordinate axes of the reference coordinates which give a reference for the operation of the robot to detect the position of the workpiece, at positions where no interference occurs between the robot and the workpiece in the virtual space. The plurality of detection starting points 51 added by the detection starting point addition part 31 are stored in the storage unit 23. The aforementioned world coordinates C1 may be used as the reference coordinates. The interference avoidance point addition part 32 detects the presence or absence of interference between the robot and the workpiece on the movement path of the robot which moves among a plurality of detection starting points and, if there is interference, automatically adds interference avoidance points in order to avoid interference in the virtual space. The interference avoidance points 52 added by the interference avoidance point addition part 32 are stored in the storage unit 23. The workpiece position detection program generation part 33 automatically generates the workpiece position detection program 21 to repeat the operations of the robot in which the robot moves between the detection starting point 51 and the contact point 50 in the direction of the movement along the coordinate axes of the reference coordinates and, if there is an interference avoidance point, moves from one detection starting point 51 through the interference avoidance point 52 to another detection starting point 51. The workpiece position detection program 21 generated by the workpiece position detection program generation part 33 is stored in the storage unit 23.

Optionally, in order to generate the workpiece position detection program 21, the CPU 22 may comprise a reference coordinates setting part 34 and a contact attitude calculation part 35. The reference coordinates setting part 34 causes the operator to set the reference coordinates which give a reference for the operation of the robot to detect the position of the workpiece using a mouse, etc. With the reference coordinates setting part 34, it is possible to freely set the reference coordinates for the workpiece arranged in the virtual space without restraint of the existing coordinates (world coordinates, mechanical interface coordinates, etc.), thus resulting in improved convenience. The contact attitude calculation part 35 automatically calculates the contact attitude when the contact sensor contacts the workpiece so as to prevent interference from occurring between the robot and the workpiece. The contact attitude calculation part 35 may not be used when the contact attitude of the robot is obviously free from interference with the workpiece.

The CPU 22 further comprises a simulation part 36 which simulates the machining program 20 and the workpiece position detection program 21 with respect to a virtual robot arranged in the virtual space. The simulation part 36 executes the workpiece position detection program 21 with respect to the virtual robot arranged in the virtual space to display a new model 37 of the workpiece stored in the storage unit 23 on the display unit 24 and to detect the position of the new model 37 of the workpiece arranged in the virtual space. It is preferable that the new workpiece model 37 may be a three-dimensional model of a workpiece having a different position or attitude than the reference model 26. Consequently, it is possible to confirm offline that the robot which performs a detection operation in accordance with the workpiece position detection program 21 does not interfere with the workpiece. Moreover, the simulation part 36 detects the position of the new workpiece model 37 from the position of the robot when a virtual contact sensor arranged at the robot distal end contacts the workpiece new model 37, corrects the machining program 20 in accordance with the detected position of the new workpiece model 37, and executes the corrected machining program 20 on the virtual robot arranged in the virtual space.

Figure 3:
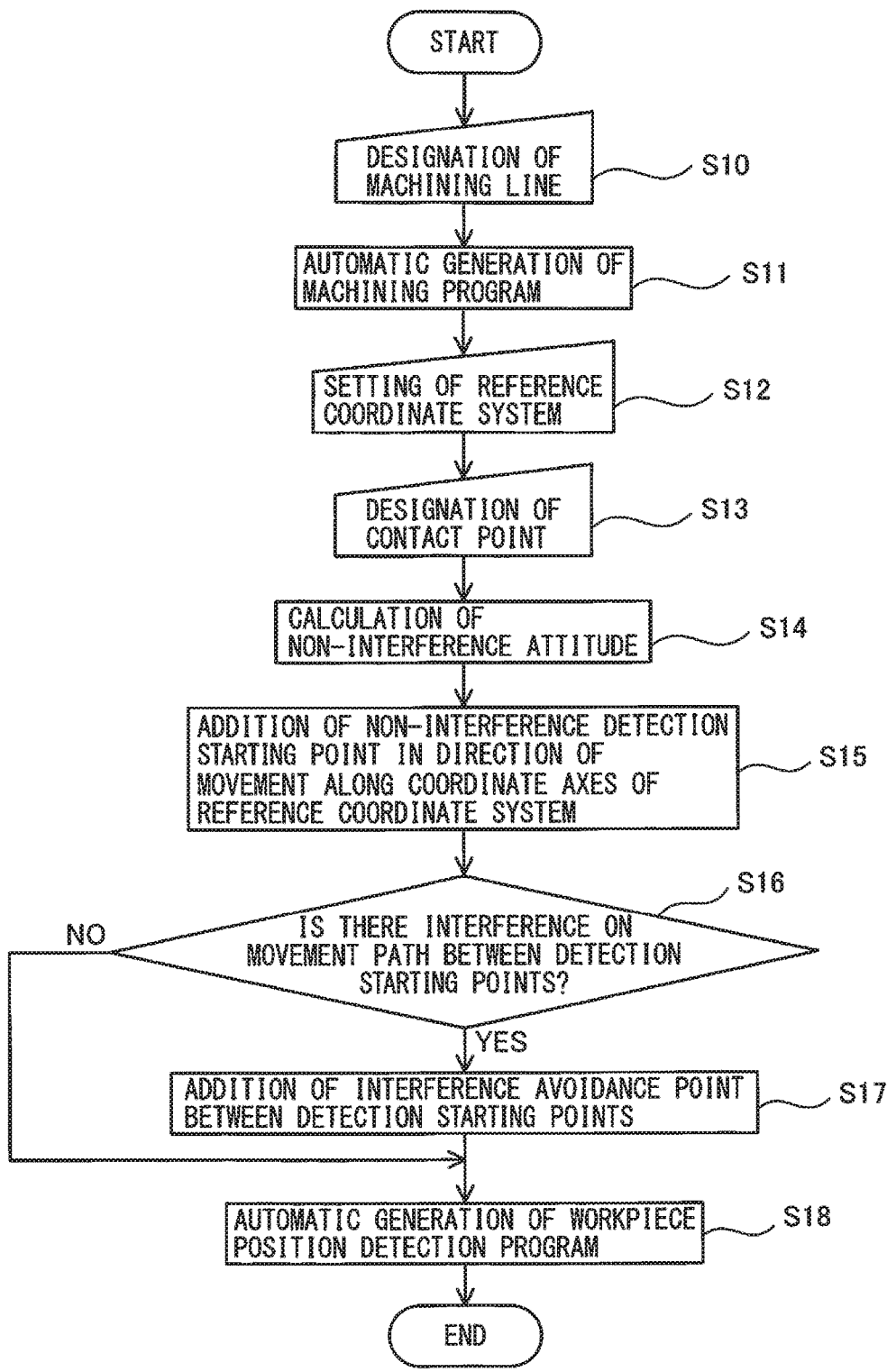
FIG. 3 is a flow chart showing the operations of an offline programming apparatus according to an embodiment of the present invention.
Figure 4A:
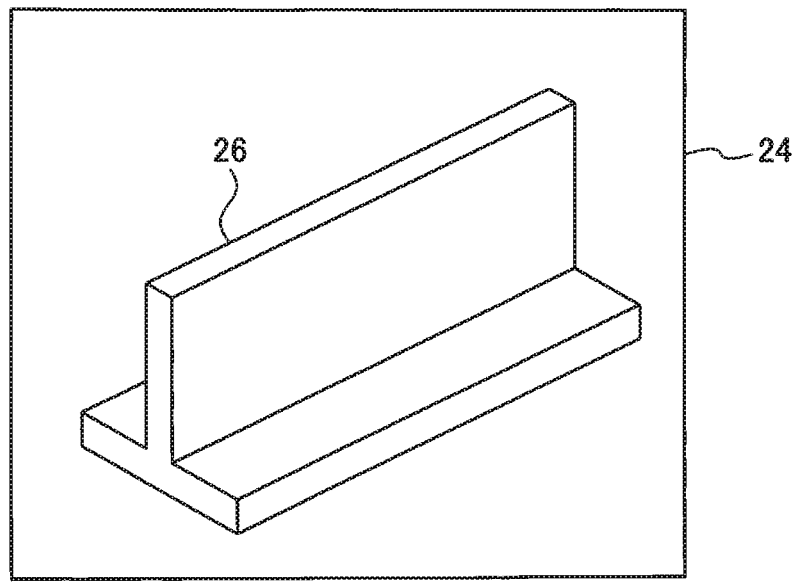
FIG. 4A is a view showing a user interface for generating a machining program and a workpiece position detection program according to an embodiment of the present invention.
Figure 4B:
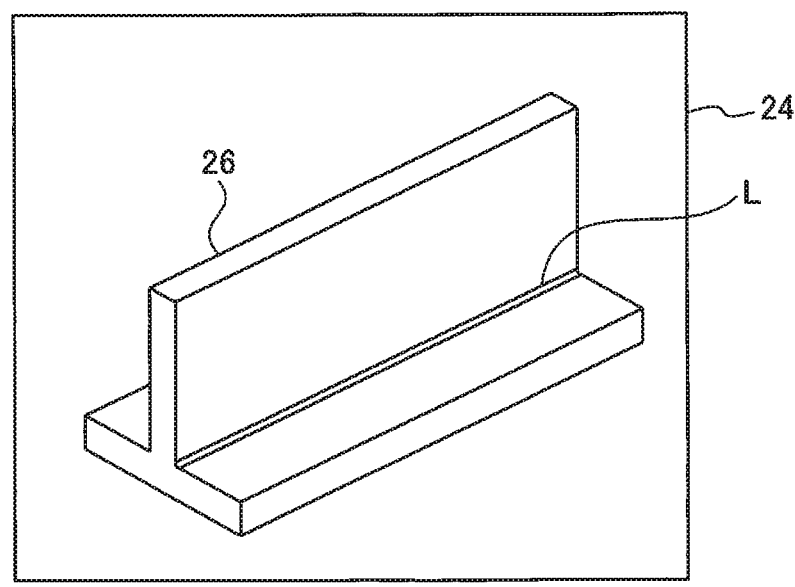
FIG. 4B is a view showing a user interface for generating a machining program and a workpiece position detection program according to an embodiment of the present invention.

FIG. 3 shows a flow chart of the operations of the offline programming apparatus according to the embodiment of the invention. FIGS. 4A to 4E illustrate the user interface to generate the machining program and the workpiece position detection program according to the embodiment of the present invention. In FIG. 3, steps S10 and S11 are those of generating the machining program, and steps S12 to S18 are those of generating the workpiece position detection program. When generation of the machining program and the workpiece position detection program begins, as shown in FIG. 4A, the reference model 26 of the workpiece is read from the storage unit and is displayed on the display unit 24. In step S10, as shown in FIG. 4B, the machining line L is designated on the workpiece reference model 26 by the operator using a mouse, etc. Alternatively, the machining point may be designated or a plurality of machining lines or points may be designated. In steps S11, the machining program is automatically generated in accordance with the designated machining line L.

Figure 4C:
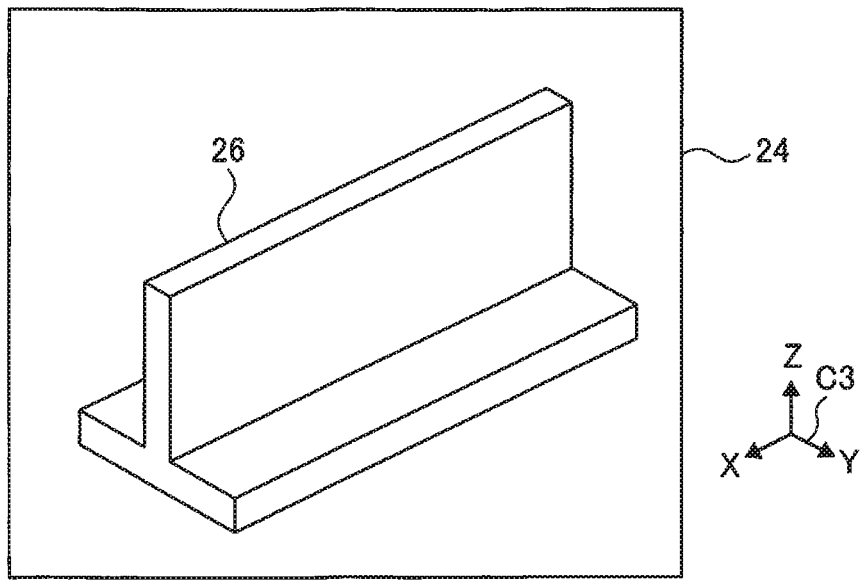
FIG. 4C is a view showing a user interface for generating a machining program and a workpiece position detection program according to an embodiment of the present invention.
Figure 4D:
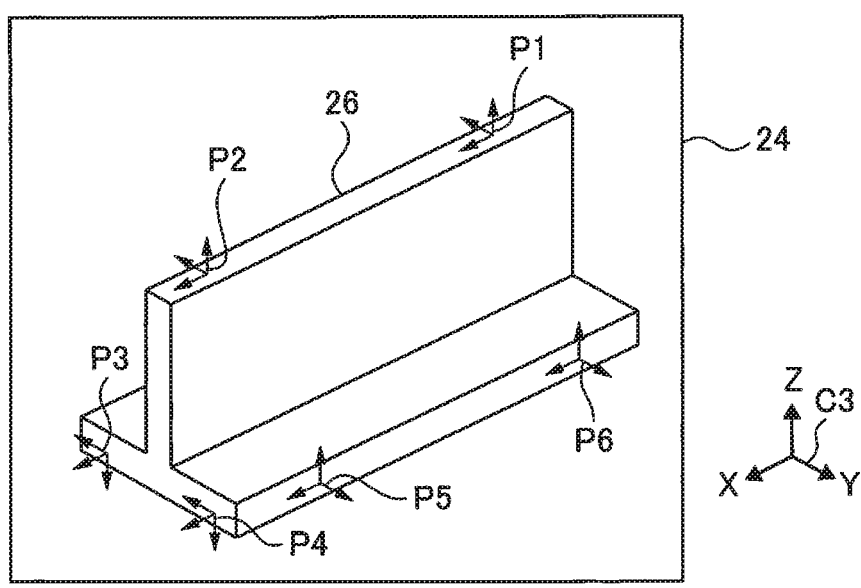
FIG. 4D is a view showing a user interface for generating a machining program and a workpiece position detection program according to an embodiment of the present invention.
Figure 4E:
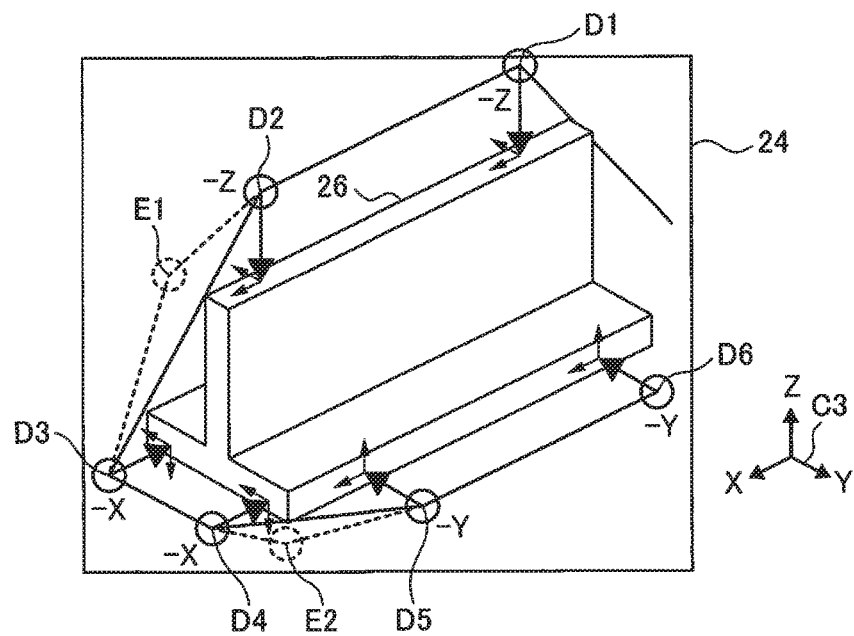
FIG. 4E is a view showing a user interface for generating a machining program and a workpiece position detection program according to an embodiment of the present invention.

Optionally, in step S12, as shown in FIG. 4C, the reference coordinate system C3, with reference to which the operation of the robot to detect the workpiece is performed, is set. In step S13, as shown in FIG. 4D, a plurality of contact points P1 to P6 at which the contact sensor is in contact with the workpiece are designated on the workpiece reference model 26 by the operator using a mouse, etc. Upon designation, it is preferable that six contact points may be designated so as to perform at least two detection operations along the respective coordinate axes of the reference coordinate system C3. Consequently, the deviation of position and attitude of the workpiece from the reference coordinate system C3 can be easily identified. Optionally, in step S14, the contact attitude of the robot when the contact sensor is in contact with the workpiece is automatically calculated so as to prevent the robot from interfering with the workpiece. In step S15, as shown in FIG. 4E, a plurality of detection starting points D1 to D6 in a plurality of operations of the robot which approaches the plurality of contact points P1 to P6 in the directions of movement (−X direction, −Y direction, −Z direction) along the coordinate axes of the reference coordinate system C3 are automatically added in the virtual space. Here, the detection starting points D1 and D2 are obtained by adding +Z to the Z coordinates of the contact points P1 and P2. Likewise, the detection starting points D3 and D4 are obtained by adding +X to the X coordinates of the contact points P3 and P4, and the detection starting points D5 and D6 are obtained by adding +Y to the Y coordinates of the contact points P5 and P6.

In step S16, the presence or absence of the interference between the robot and the workpiece on the movement path of the robot which moves among the plurality of detection starting points D1 to D6 is detected. As shown in FIG. 4E, the robot interferes with the workpiece (YES in step S16) on the movement path of the robot which moves between the detection starting points D2 and D3 and between the detection starting points D4 and D5, and accordingly, in step S17, interference avoidance points E1 and E2 are automatically added in the virtual space between the detection starting points D2 and D3 and between the detection starting points D4 and D5, respectively. On the other hand, no interference occurs between the robot and the workpiece (NO in step S16) on the movement path of the robot which moves between the detection starting points D1 and D2, between the detection starting points D3 and D4, and between the detection starting points D5 and D6, and accordingly, the control proceeds to step S18.

In step S18, the workpiece position detection program is automatically generated, wherein the operations of the robot which moves between the detection starting points D1 to D6 and the contact points P1 to P6 in the directions of movement (−X direction, −Y direction, −Z direction) along the coordinate axes of the reference coordinate system C3, and if there is an interference avoidance point, moves from one detection starting point through the interference avoidance points E1 and E2 to another detection starting point are repeated. Thus, the generation operation of the machining program and the workpiece position detection program ends.

Figure 5A:
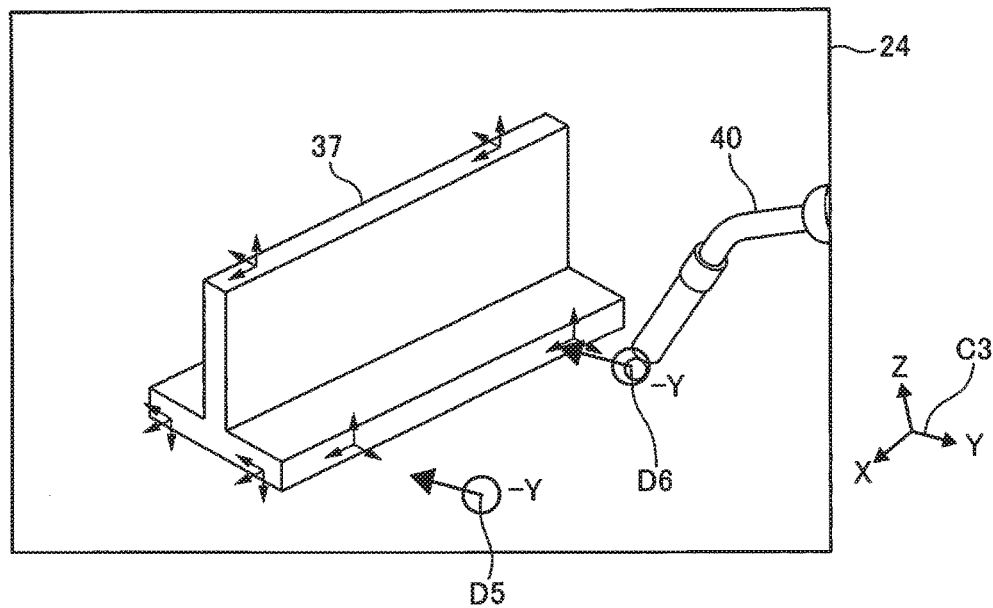
FIG. 5A is a view showing a user interface for simulating a workpiece position detection program and a machining program according to an embodiment of the present invention.
Figure 5B:
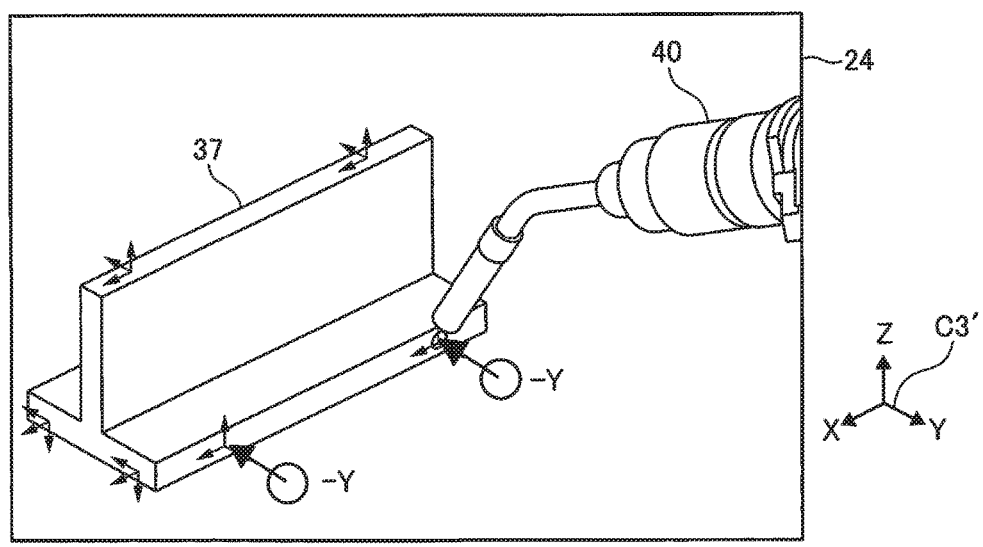
FIG. 5B is a view showing a user interface for simulating a workpiece position detection program and a machining program according to an embodiment of the present invention.

FIGS. 5A and 5B are views showing a user interface for simulating the workpiece position detection program and the machining program according the embodiment of the present invention. As can be seen in FIG. 5A, the workpiece new model 37 (three-dimensional model of a workpiece having a position or attitude different from that of the reference model 26) is read from the storage unit and is displayed on the display unit 24. Thereafter, the workpiece position detection program is executed with respect to the virtual robot 40 arranged in the virtual space. The virtual robot 40 approaches the new workpiece mode 37 from the detection starting points (D5, D6) in the direction of movement (−Y direction) along the coordinate axis (Y-axis) of the reference coordinate system C3 and detects the position of the new workpiece model 37 from the position of the robot when the robot contacts the workpiece new model 37. The deviation of the position or attitude of the workpiece new model 37 from the reference coordinate system C3 is calculated. As shown in FIG. 5B, the reference coordinate system C3 is converted to a reference coordinate system C3' so that the position or attitude of the workpiece new model 37 is coincident with the position or attitude of the workpiece reference model 26. Alternatively, the position or attitude of the workpiece new model 37 may be converted so that the position or attitude of the workpiece new model 37 is coincident with the position or attitude of the workpiece reference model 26. As a result, the position and attitude of the workpiece new model 37 are coincident with the position and attitude of the workpiece reference model 26, and accordingly, it is possible to execute the workpiece position detection program so as to prevent the occurrence of interference between the robot and the workpiece in connection with the new model 37 of the workpiece. Note that, the positional relationship between the workpiece and the reference coordinate system is adjusted regarding the X-axis and Z-axis in the same way, although this is not shown in the drawings. The offline programming apparatus performs simulation of the machining program after performing simulation of the position detection program. Thus, the operator can confirm in advance that the robot does not interfere with the workpiece without executing the workpiece position detection program and the machining program in a real robot.

According to the offline programming apparatus 10 according to the embodiment of the present invention, in the detection operation to detect the position of the workpiece, the operations of the robot which moves between the detection starting points D1 to D6 and the contact points P1 to P6 in the direction of movement (−X direction, −Y direction, −Z direction) along the coordinate axes of the reference coordinate system C3, and if there is an interference avoidance point, and moves from one detection starting point to through the interference avoidance points E1, E2 another detection starting point are repeated, and accordingly, a workpiece position detection program which prevents interference from occurring between the robot and the workpiece even on the movement path of the robot which moves between the plurality of detection starting points can be generated.

It is possible to provide the software of the aforementioned embodiments which is recorded in a computer-readable non-transitory recording medium or CD-ROM, etc. Although various embodiments have been discussed in the specification of the present application, it should be recognized that the prevent invention is not limited thereto, but may be variously modified or changed within the scope of the invention described in the claims below.

The invention claimed is:

1. An offline programming apparatus which automatically generates a machining program based on a machining line or point designated on a three-dimensional model of a workpiece to be machined by a robot and automatically generates a workpiece position detection program to detect a position of the workpiece in order to correct the machining program in accordance with the position of the workpiece detected based on a contact sensor arranged at a distal end of the robot, the apparatus comprising:

a storage unit which stores therein the three-dimensional model of the workpiece, a contact point designation part which causes an operator to designate a plurality of contact points at which the contact sensor contacts the workpiece on the three-dimensional model of the workpiece, a detection starting point addition part which automatically adds a plurality of detection starting points in the operations of the robot which approaches each of the plurality of contact points in directions of movement along coordinate axes of a reference coordinate system with reference to which the operation of the robot to detect the position of the workpiece is performed, at positions where no interference occurs between the robot and the workpiece in a virtual space, an interference avoidance point addition part which detects the presence or absence of interference between the robot and the workpiece on the movement path of the robot which moves between the plurality of detection starting points, and if there is interference, automatically adds an interference avoidance point in the virtual space in order to avoid the interference, and a workpiece position detection program generation part which automatically generates the workpiece position detection program to repeat the operations of the robot which moves between the detection starting points and the contact points in a direction of movement along the coordinate axis of the reference coordinate system, and if there is an interference avoidance point, moves from one detection starting point through the interference avoidance point to another detection starting point.

2. The offline programming apparatus according to claim 1, further comprising a reference coordinate system setting part which sets the reference coordinate system.

3. The offline programming apparatus according to claim 1, further comprising a simulation part which simulates the workpiece position detection program and the machining program on a virtual robot arranged in a virtual space.

4. The offline programming apparatus according to claim 1, further comprising a machining line division part which divides the machining line into a plurality of machining lines or a machining line or point designation part which causes an operator to designate a plurality of machining lines or a plurality of machining points on the three-dimensional model of the workpiece, wherein the workpiece position detection program is automatically generated to correct the machining program generated based on the plurality of machining lines or machining points.

5. An offline programming method for automatically generating a machining program based on a machining line or point designated on a three-dimensional model of a workpiece to be machined by a robot and automatically generating a workpiece position detection program to detect a position of the workpiece in order to correct the machining program in accordance with the position of the workpiece detected based on a contact sensor arranged at a distal end of the robot, the method comprising the steps of:

storing the three-dimensional model of the workpiece in a storage unit, causing an operator to designate a plurality of contact points at which the contact sensor contacts the workpiece on the three-dimensional model of the workpiece, automatically adding a plurality of detection starting points in the operations of the robot which approaches each of the plurality of contact points in directions of movement along coordinate axes of a reference coordinate system with reference to which the operation of the robot to detect the position of the workpiece is performed, at positions where no interference occurs between the robot and the workpiece in a virtual space, detecting the presence or absence of interference between the robot and the workpiece on the movement path of the robot which moves between the plurality of detection starting points, and if there is interference, automatically adding an interference avoidance point in the virtual space in order to avoid the interference, and automatically generating the workpiece position detection program to repeat the operations of the robot which moves between the detection starting points and the contact points in a direction of movement along the coordinate axis of the reference coordinate system, and if there is an interference avoidance point, moves from one detection starting point through the interference avoidance point to another detection starting point.

* * * * *